United States Patent
Ketrow

(10) Patent No.: US 6,818,127 B1
(45) Date of Patent: Nov. 16, 2004

(54) RAIN COLLECTION SYSTEM

(76) Inventor: James L. Ketrow, 6410 Pine St. NE., St Petersburg, FL (US) 33702

(\*) Notice: Subject to any disclaimer, the term of this patent is extended or adjusted under 35 U.S.C. 154(b) by 152 days.

(21) Appl. No.: 10/103,933

(22) Filed: Mar. 22, 2002

(51) Int. Cl.$^7$ .......................... B01D 35/027; E02B 7/00
(52) U.S. Cl. ................... 210/170; 210/257.1; 210/258; 405/70; 405/114
(58) Field of Search .............................. 52/3–5, 11–12, 52/23–36, 63–64, 71, 15–16; 405/70–71, 114, 126; 210/195.1, 258, 257.1, 170, 241, 172, 502.1, 503, 167, 169; 296/213

(56) References Cited

U.S. PATENT DOCUMENTS

| | | | | |
|---|---|---|---|---|
| 407,854 | A | * | 7/1889 | Dornbirer ................. 210/257.1 |
| 623,894 | A | * | 4/1899 | Freise ......................... 210/241 |
| 1,059,935 | A | * | 4/1913 | Guderian ................... 210/314 |
| 4,139,117 | A | * | 2/1979 | Dial ............................ 220/218 |
| 4,335,977 | A | * | 6/1982 | Ihli ............................. 210/170 |
| 4,541,446 | A | * | 9/1985 | Hogan ........................... 137/2 |
| 4,667,448 | A | * | 5/1987 | Smith ............................ 52/12 |
| 4,726,151 | A | * | 2/1988 | Vitale ............................ 52/16 |
| 4,934,404 | A | | 6/1990 | DeStefano |
| 5,220,755 | A | * | 6/1993 | Roles ............................ 52/16 |
| 5,234,286 | A | * | 8/1993 | Wagner ....................... 405/53 |
| 5,282,546 | A | | 2/1994 | Bauer |
| 5,301,474 | A | * | 4/1994 | Carey et al. ................ 52/90.1 |
| D353,436 | S | | 12/1994 | Hess |
| 5,730,179 | A | * | 3/1998 | Taylor ......................... 137/357 |
| 5,735,304 | A | * | 4/1998 | Chumley ................... 137/15.01 |
| 5,862,633 | A | * | 1/1999 | Van Ells ........................ 52/16 |
| 5,863,151 | A | | 1/1999 | Chapotelle |
| 5,873,383 | A | | 2/1999 | Takai et al. |
| 6,182,680 | B1 | * | 2/2001 | Hart ............................ 137/122 |
| 6,240,680 | B1 | * | 6/2001 | Estes .............................. 52/16 |
| 6,241,877 | B1 | * | 6/2001 | Berkey ......................... 210/97 |
| 6,357,183 | B1 | * | 3/2002 | Smith ............................ 52/15 |
| 6,436,283 | B1 | * | 8/2002 | Duke .......................... 210/172 |
| 6,517,285 | B2 | * | 2/2003 | Hill ............................. 405/52 |
| 6,526,699 | B1 | * | 3/2003 | Foglio, Sr. .................... 52/15 |
| 6,619,312 | B2 | * | 9/2003 | Doiron ....................... 137/122 |
| 6,663,769 | B2 | * | 12/2003 | Hosoya ...................... 210/104 |

FOREIGN PATENT DOCUMENTS

| | | | |
|---|---|---|---|
| GB | 2286849 A | * | 8/1995 |
| GB | 2291924 | * | 2/1996 |
| GB | 2314367 | * | 12/1997 |
| JP | 09-067838 | * | 3/1997 |
| JP | 09-078638 | * | 3/1997 |
| JP | 09-111813 | * | 4/1997 |
| JP | 09-111817 | * | 4/1997 |
| JP | 09-242129 | * | 9/1997 |
| JP | 10-216734 | * | 8/1998 |
| WO | WO 98/22665 | * | 5/1998 |

OTHER PUBLICATIONS

Patent Abstract & Machine Translation of claims, detailed description and drawings of JP 09–078638.*
Patent Abstract & Machine Translation of detailed description of JP 10–216734.*

\* cited by examiner

Primary Examiner—Terry K. Cecil

(57) ABSTRACT

A rain collection system for collecting and storing rainwater. The rain collection system includes a collection assembly being designed for being positioned on a support surface. The collection assembly is designed for collecting rain that has fallen on the support surface. A storage assembly has a tank. The tank is in fluid communication with the collection assembly whereby rain collected by the collection assembly is stored in the tank of the storage assembly for use by the user. A filtration assembly is in fluid communication between the collection assembly to the storage assembly. The filtration assembly is designed for filtering contaminates from the rain being transferred from the collection assembly to the storage assembly.

6 Claims, 7 Drawing Sheets

RAIN COLLECTION SYSTEM

BACKGROUND OF THE INVENTION

1. Field of the Invention

The present invention relates to rainwater saver systems and more particularly pertains to a new rain collection system for collecting and storing rainwater.

2. Description of the Prior Art

The use of rainwater saver systems is known in the prior art. U.S. Pat. No. 5,863,151 describes a system for collecting and redistributing rain collected the gutters of a building. Another type of rainwater saver system is U.S. Pat. No. 5,730,179 having a tank connectable to a gutter down spout to collect rain collected in the gutters. U.S. Pat. No. 5,282,546 has a vault having a inner tank enclosed in insulation for storing water above ground. U.S. Pat. No. 5,873,383 has storage vessels in communication with a gutter system of a building to allow rain in the gutter system to being collected in the storage vessels. U.S. Pat. No. 4,934,404 has a receptacle coupled to a roof of a building for collecting rainwater and storing the rainwater in a reservoir for later use. U.S. Pat. No. Des. 353,436 shows an emergency water storage tank.

While these devices fulfill their respective, particular objectives and requirements, the need remains for a system that has certain improved features to allow treatment of the rain before being stored for consumability.

SUMMARY OF THE INVENTION

The present invention meets the needs presented above by providing a filtration assembly for filtering the rain before it is stored in the tank to bring the water to a consumable level.

Still yet another object of the present invention is to provide a new rain collection system that allows for transporting of the tank with the water for use in applications away from the collection assembly.

To this end, the present invention generally comprises a collection assembly being designed for being positioned on a support surface. The collection assembly is designed for collecting rain that has fallen on the support surface. A storage assembly has a tank. The tank is in fluid communication with the collection assembly whereby rain collected by the collection assembly is stored in the tank of the storage assembly for use by the user. A filtration assembly is in fluid communication between the collection assembly to the storage assembly. The filtration assembly is designed for filtering contaminates from the rain being transferred from the collection assembly to the storage assembly.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
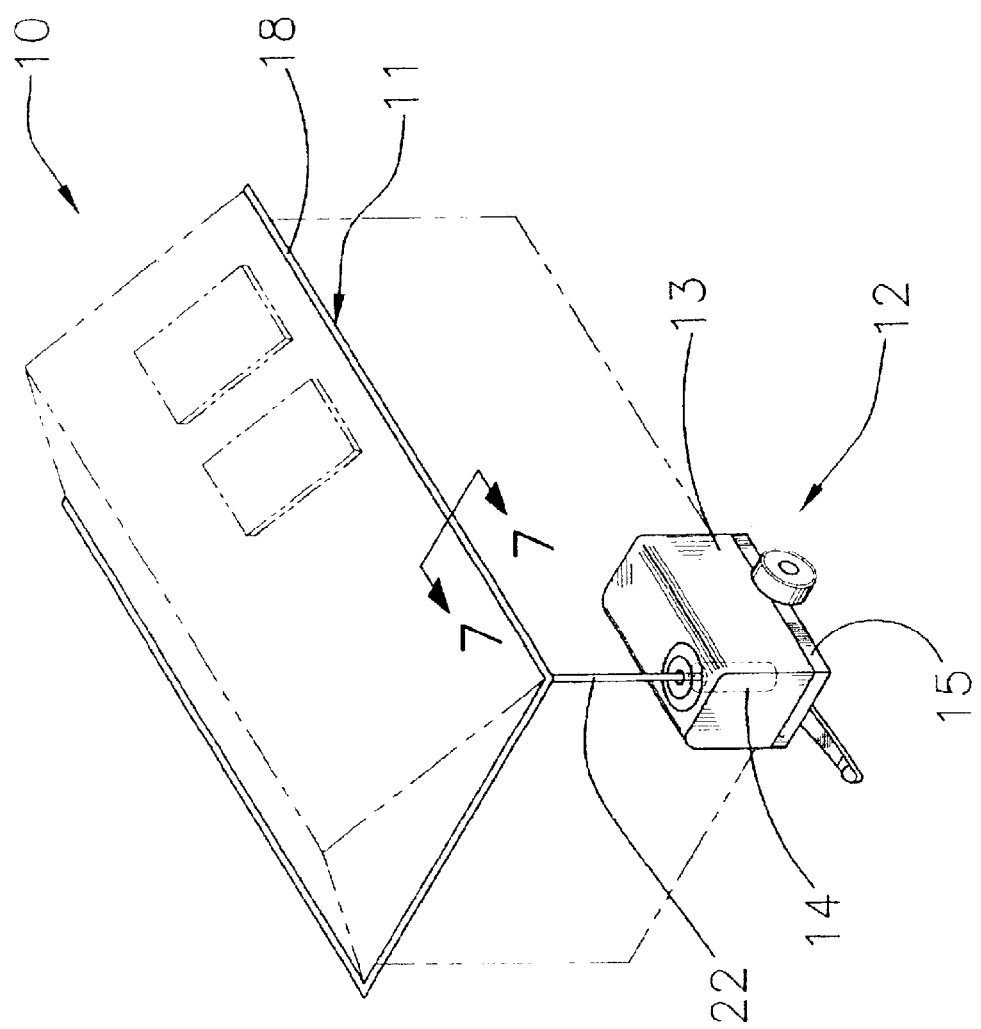
FIG. 1 is a perspective view of a new rain collection system according to the present invention.
Figure 2:
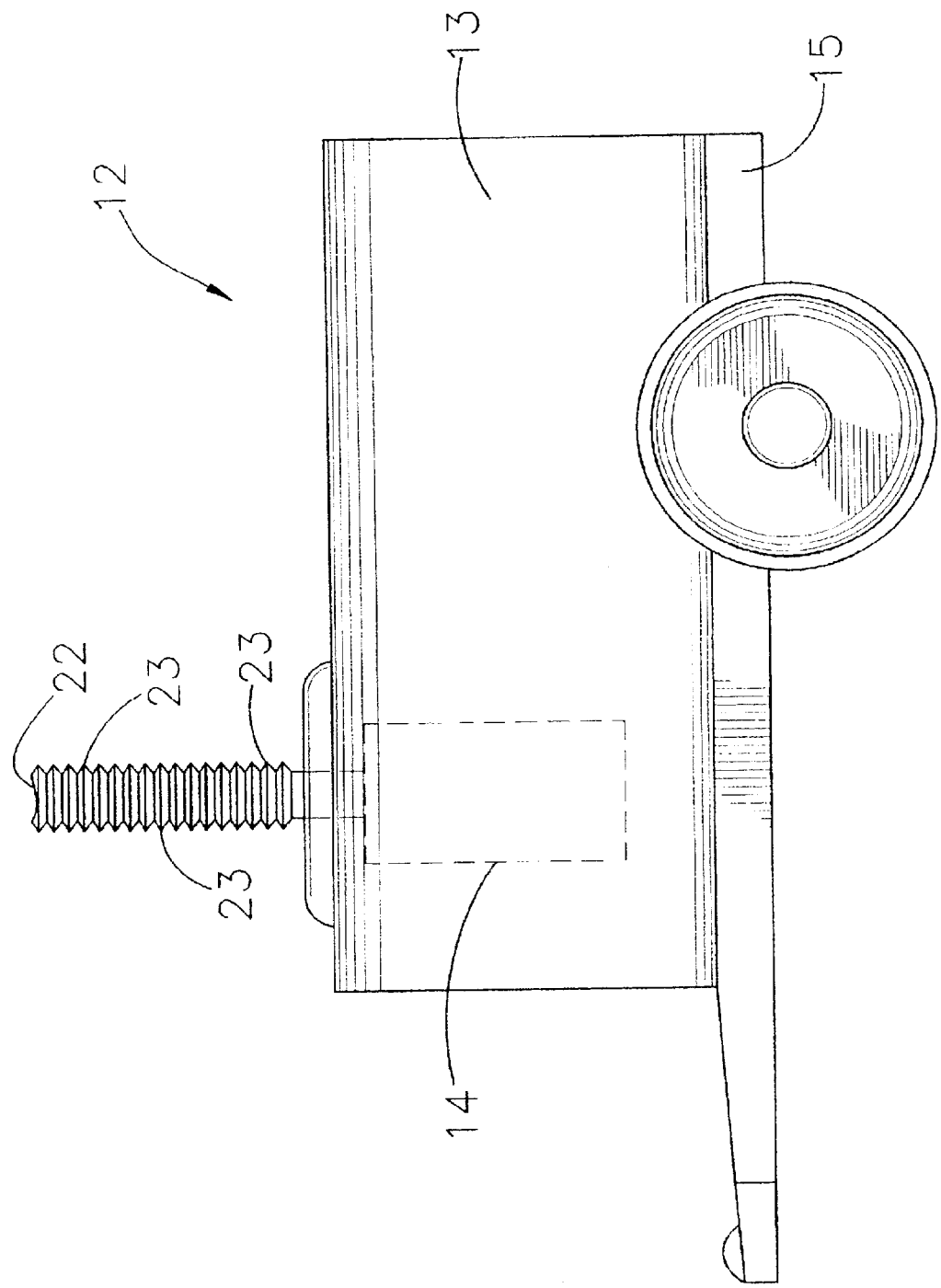
FIG. 2 is a side view of the storage assembly of the present invention.
Figure 3:
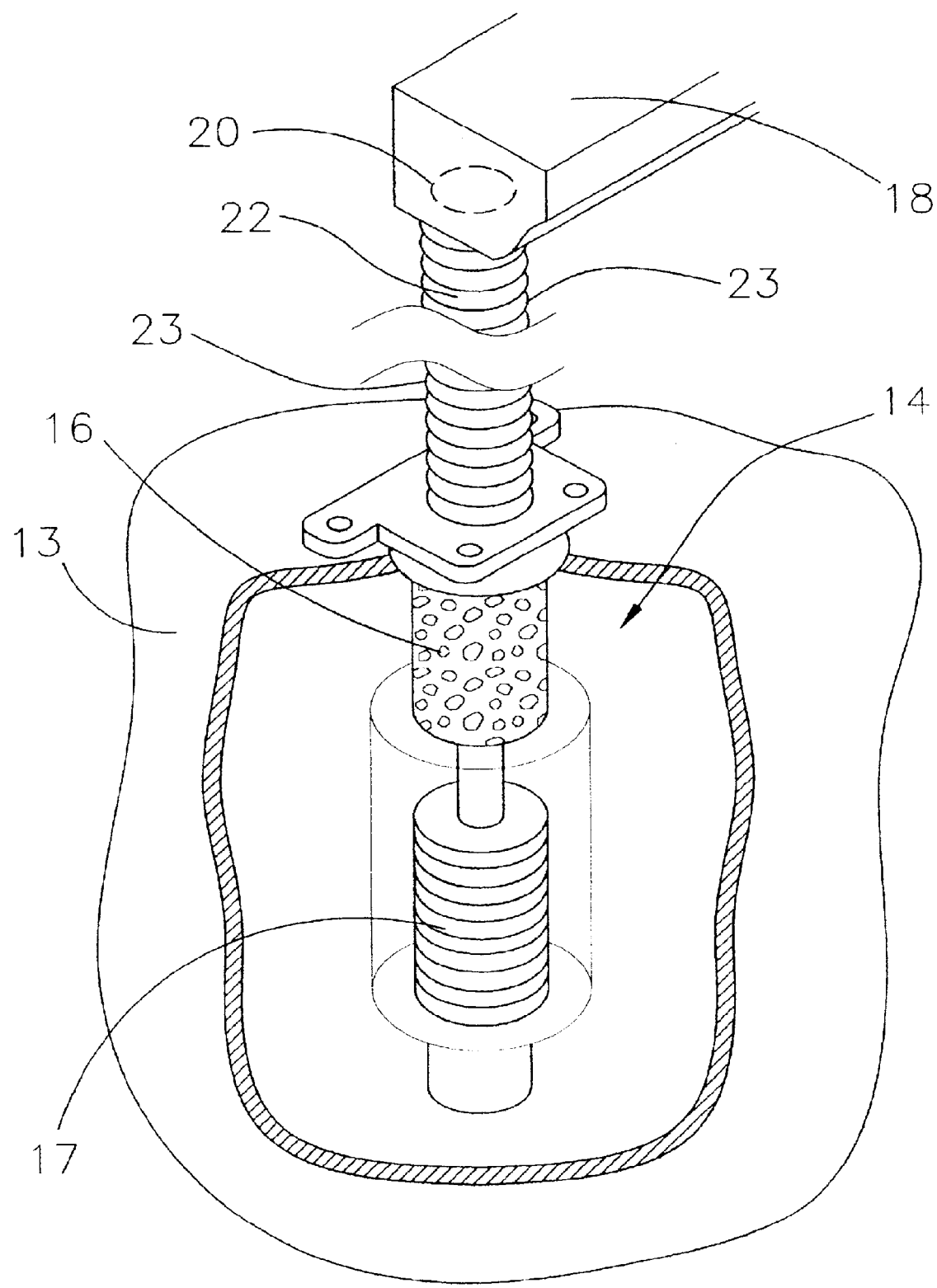
FIG. 3 is a partial cross-sectional view of the tank to show the filtration assembly of the present invention.

With reference now to the drawings, and in particular to FIGS. 1 through 7 thereof, a new rain collection system embodying the principles and concepts of the present invention and generally designated by the reference numeral 10 will be described.

As best illustrated in FIGS. 1 through 7, the rain collection system 10 generally comprises a collection assembly 11 being designed for being positioned on a support surface. The collection assembly 11 is designed for collecting rain that has fallen on the support surface.

A storage assembly 12 has a tank 13. The tank 13 is in fluid communication with the collection assembly 11 whereby rain collected by the collection assembly 11 is stored in the tank 13 of the storage assembly 12 for use by the user.

A filtration assembly 14 is in fluid communication between the collection assembly 11 to the storage assembly 12. The filtration assembly 14 is designed for filtering contaminates from the rain being transferred from the collection assembly 11 to the storage assembly 12.

The storage assembly 12 has a trailer 15. The trailer 15 is selectively couplable to the tank 13 of the storage assembly 12. The trailer 15 is designed for coupling to a vehicle for transporting the tank 13 to a facility to store the rain stored in the tank 13 when the collection assembly 11 has been disengaged from the tank 13 of the storage assembly 12.

The filtration assembly 14 has a first filter 16. The first filter 16 is in fluid communication with the collection assembly 11. The first filter 16 is designed for filtering particulate contaminates and odors from the rain collected by the collection assembly 11 when the rain is being transferred to the tank 13 of the storage assembly 12.

The first filter 16 of the filtration system comprises activated charcoal. The activated charcoal is designed for filtering small particulate contaminates and odors from the rain is transferred to the tank 13 of the storage assembly 12.

The filtration assembly 14 has a second filter 17. The second filter 17 is in fluid communication between the first filter 16 and the tank 13 of the storage assembly 12. The second filter 17 is designed for filtering contaminates that have passed through the first filter 16.

The collection assembly 11 has a channel member 18. The channel member 18 is designed for coupling to a roof of a building whereby the channel member 18 extends around a perimeter of the roof. The channel member 18 has a channel 19. The channel member 18 has a drain port 20 in fluid communication with the filtration assembly 14. The channel 19 of the channel member 18 is designed for collecting and directing the rain to the drain port 20 for draining the rain collected by the channel 19 from the channel member 18.

The collection assembly 11 has a screen member 21. The screen member 21 is positioned across a top opening of the channel 19 of the channel member 18. The screen member 21 is designed for inhibiting large objects from entering the channel 19 of the channel member 18 for inhibiting the large objects from clogging the channel 19 of the channel member 18.

The collection assembly 11 has a drain conduit 22. The drain conduit 22 is coupled to the channel member 18 whereby the drain conduit 22 is in fluid communication between the drain port 20 of the channel member 18 and the filtration assembly 14. The drain conduit 22 is designed for directing the rain draining through the drain port 20 of the channel member 18 to the filtration assembly 14.

The drain conduit 22 of the collection assembly 11 comprises a plurality of accordion folds 23. The accordion folds 23 selectively compress and expand for allowing adjusting of a length of the drain conduit 22. The accordion folds 23 of the drain conduit 22 are for allowing flexible positioning of the drain conduit 22 for extending between the channel member 18 of the collection assembly 11 and the filtration assembly 14.

Figure 4:
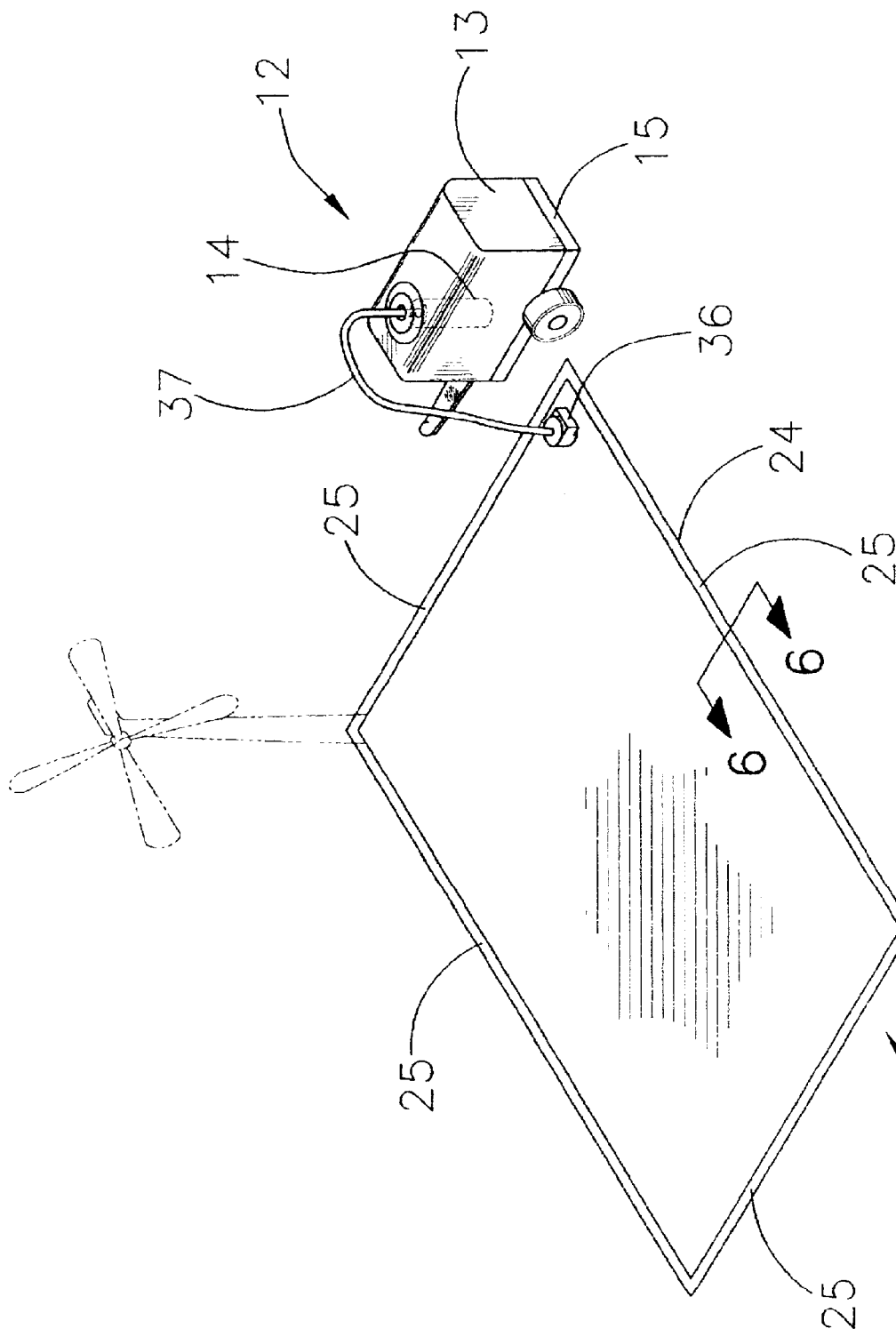
FIG. 4 is a perspective view of an embodiment of the present invention.
Figure 5:
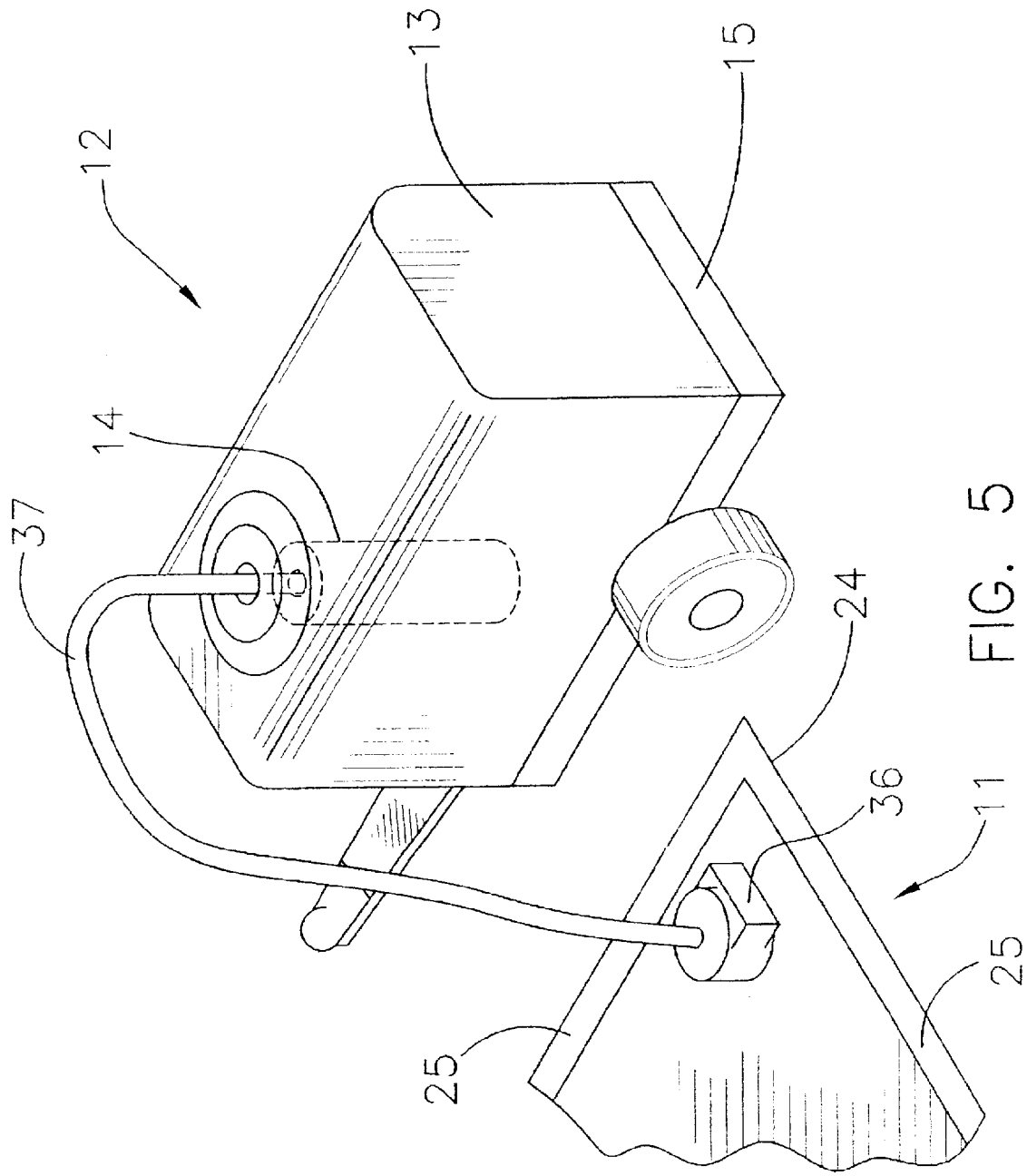
FIG. 5 is an enlarge perspective view of the pump means and the storage assembly of the present invention.
Figure 6:
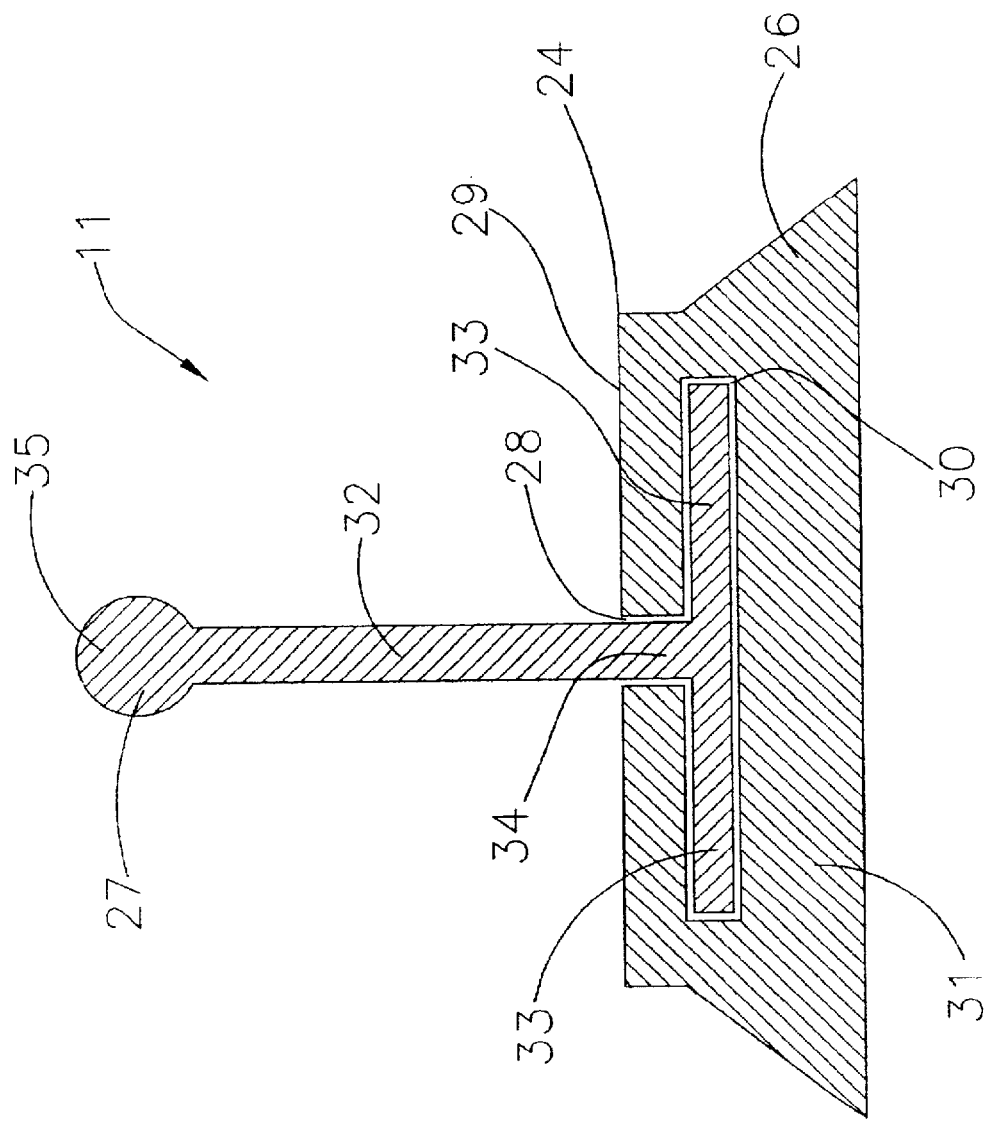
FIG. 6 is a cross-sectional view of the barrier member of the embodiment of the present invention taken along line 6—6 of FIG. 4.
Figure 7:
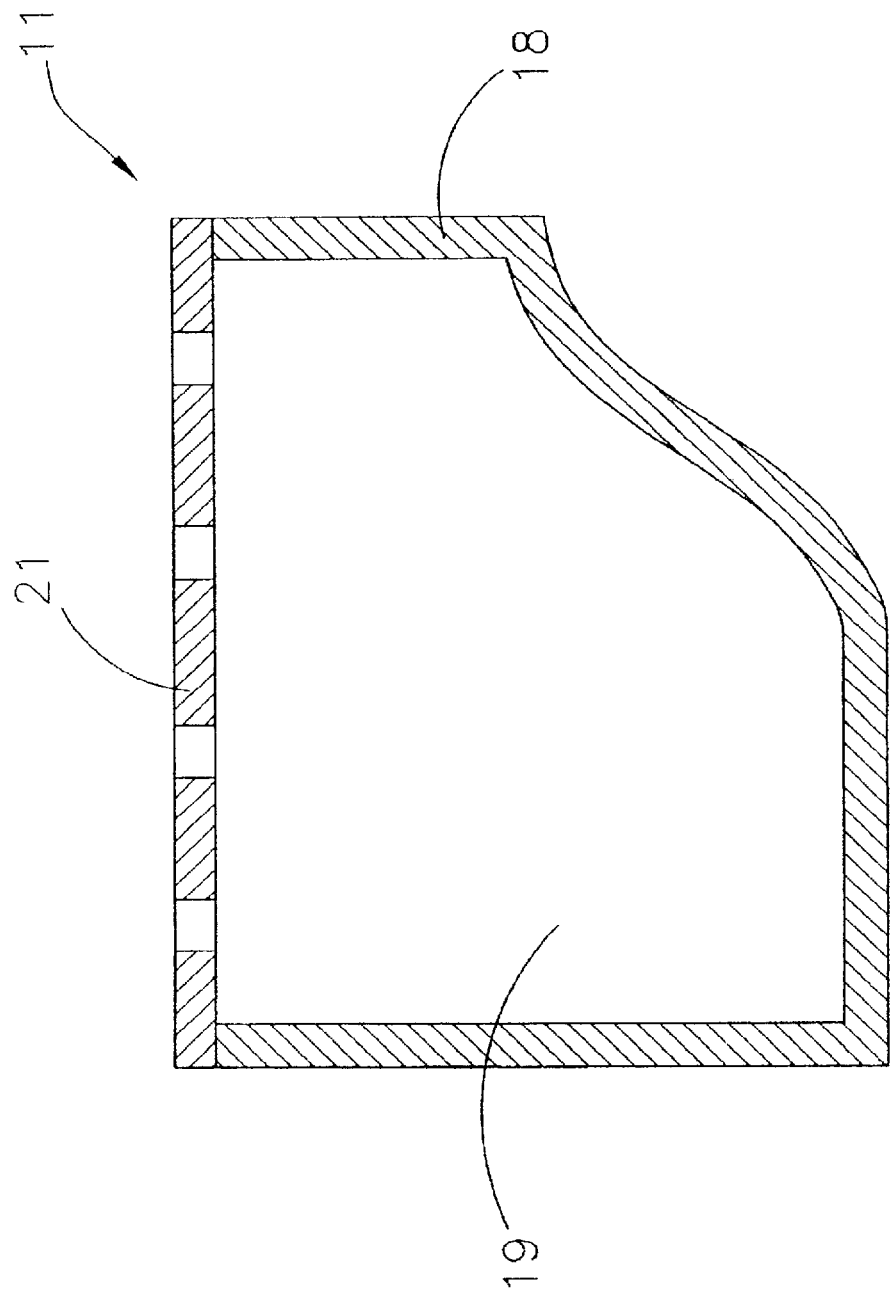
FIG. 7 is a cross-sectional view of the channel member of the present invention taken along line 7—7 of FIG. 1.

In an embodiment, as shown in FIGS. 4 through 6, the collection assembly 11 has a barrier member 24. The barrier member 24 is designed for being positioned on a horizontal surface whereby the barrier member 24 defines an enclosed area on the horizontal surface. The barrier member 24 is designed for inhibiting drainage of rain from the enclosed area when the rain falls in the enclosed area. The barrier member 24 of the collection assembly 11 has a plurality of sections 25. Each of the sections 25 is selectively coupled to an adjacent pair of the sections 25 whereby the sections 25 are designed for enclosing the enclosed area when the sections 25 are coupled together.

The barrier member 24 of the collection assembly 11 has a base portion 26 and a barrier portion 27. The base portion 26 is designed for resting on the horizontal surface. The barrier portion 27 is selectively coupled to the base portion 26 whereby the barrier portion 27 is designed for inhibiting draining of rain from the enclosed area when the barrier portion 27 is coupled the base portion 26. The barrier member 24 is removable from the base portion 26 for facilitating storage of the barrier member 24 when the barrier member 24 is not in use.

The base portion 26 of the barrier member 24 of the collection assembly 11 has a slot 28 extending through a top portion 29 of the base portion 26 along a length of the top portion 29 of the base portion 26. The base portion 26 has a groove 30 extending along a length of a bottom portion 31 of the base portion 26 whereby the groove 30 is in communication with the slot 28 of the base portion 26. The barrier portion 27 has a stanchion portion 32 and a pair of flange portions 33. The flange portions 33 oppositely extend from a base end 34 of the stanchion portion 32. The flange portions 33 are selectively positionable in the groove 30 of the base portion 26 whereby the stanchion portion 32 extends through the slot 28 of the base portion 26. A free end 35 of the stanchion portion 32 of the barrier portion 27 is positioned a distance from the top portion 29 of the base portion 26 whereby the stanchion portion 32 is designed for inhibiting drainage of rain from the enclosed area.

The collection assembly 11 has a pump means 36 designed for pumping rain from the enclosed area to the filtration assembly 14. The pump means 36 is designed for being positioned in a depressed area of the enclosed area whereby rain in the enclosed area will drain to the pump means 36. The collection assembly 11 has a pump conduit 37. The pump conduit 37 is in fluid communication between the pump means 36 and the filtration assembly 14. The pump conduit 37 is designed for directing water from the pump means 36 to the filtration assembly 14 when the pump means 36 is pumping rain from the enclosed area.

In use, the user couples the channel member 18 to the roof of the building. Rain water draining off the roof of the building passes into the channel 19 of the channel member 18 and drains to the drain port 20. The rain then drains from the drain port 20 into the drain conduit 22 so that the rain passes through the filter and is collected and stored in the tank 13 of the storage assembly 12. In the alternative the user couples the barrier portion 27 to the base portion 26 of the barrier member 24 and arranges the barrier member 24 to form an enclosed area. The pump means 36 is then placed at depression area of the enclosed area and the pump means 36 pumps the rain collected in the enclosed area through the filtration assembly 14 and into the tank 13.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A rain collection system for collecting rain to supplement water needs of a user, the rain collection system comprising:

a collection assembly being adapted for being positioned on a support surface, said collection assembly being adapted for collecting rain that has fallen on the support surface;

a storage assembly having a tank, said tank being in fluid communication with said collection assembly such that rain collected by said collection assembly is stored in said tank of said storage assembly for use by the user, said tank comprising a perimeter wall such that said perimeter wall defines an interior space of said tank, said interior space of said tank being in fluid communication with said collection assembly to receive the rain collected by said collection assembly;

a filtration assembly in fluid communication between said collection assembly and said storage assembly, said filtration assembly being adapted for filtering contaminates from the rain being transferred from said collection assembly to said storage assembly; and said filtration assembly having a first filter, said first filter being in fluid communication with said collection assembly, said first filter being adapted for filtering particulate contaminates and odors from the rain collected by said collection assembly when the rain is being transferred to said tank of said storage assembly, said filtration assembly being positioned in said interior space of said tank of said storage assembly such that said first filter is positioned in said interior space of said tank to filter the rain received by interior space of said tank from said collection assembly;

said collection assembly having a barrier member, said barrier member being adapted for being positioned on a horizontal surface such that said barrier member defines an enclosed area on the horizontal surface, said barrier member being adapted for inhibiting drainage of rain from the enclosed area when the rain falls in the enclosed area;

said barrier member of said collection assembly having a base portion and a barrier portion, said base portion being adapted for resting on the horizontal surface, said barrier portion being selectively coupled to said base portion such that said barrier portion is adapted for inhibiting draining of rain from the enclosed area when said barrier portion is coupled said base portion, said barrier member being removable from said base portion for facilitating storage of said barrier member when said barrier member is not in use;

said base portion of said barrier member of said collection assembly having a slot extending through a top portion of said base portion along a length of said top portion of said base portion, said base portion having a groove extending along a length of a bottom portion of said base portion such that said groove is in communication with said slot of said base portion; and said barrier portion having a stanchion portion and a pair of flange portions, said flange portions oppositely extending from a base end of said stanchion portion, said flange, portions being selectively positionable in said groove of said base portion such that said stanchion portion extends through said slot of said base portion, a free end of said stanchion portion of said barrier portion being positioned a distance from said top portion of said base portion such that said stanchion portion is adapted for inhibiting drainage of rain from the enclosed area.

2. The rain collection system as set forth in claim 1, further comprising:

said storage assembly having a trailer, said trailer being selectively couplable to said tank of said storage assembly, said trailer being adapted for coupling to a vehicle for transporting said tank to a facility to store the rain stored in said tank when said collection assembly has been disengaged from said tank of said storage assembly.

3. The rain collection system as set forth in claim 1, further comprising:

said first filter of said filtration system comprising activated charcoal, said activated charcoal being adapted for filtering small particulate contaminates and odors from the rain being transferred to said tank of said storage assembly.

4. The rain collection system as set forth in claim 1, further comprising:

said filtration assembly having a second filter, said second filter being in fluid communication between said first filter and said tank of said storage assembly, said second filter being adapted for filtering contaminates that have passed through said first filter.

5. The rain collection system as set forth in claim 1, further comprising:

said collection assembly having a pump means adapted for pumping rain from the enclosed area to said filtration assembly, said pump means being adapted for being positioned in a depressed area of the enclosed area such that rain in the enclosed area will drain to said pump means.

6. The rain collection system as set forth in claim 5, further comprising:

said collection assembly having a pump conduit, said pump conduit being in fluid communication between said pump means and said filtration assembly, said pump conduit being adapted for directing water from said pump means to said filtration assembly when said pump means is pumping rain from the enclosed area.

* * * * *